United States Patent
Bhat et al.

(10) Patent No.: US 11,461,131 B2
(45) Date of Patent: *Oct. 4, 2022

(54) HOSTING VIRTUAL MACHINES ON A SECONDARY STORAGE SYSTEM

(71) Applicant: Cohesity, Inc., San Jose, CA (US)

(72) Inventors: Anand Bhat, Bangalore (IN); Anil Kumar Boggarapu, Bangalore (IN); Arvind Jagannath, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/115,214

(22) Filed: Dec. 8, 2020

(65) Prior Publication Data

US 2021/0173698 A1 Jun. 10, 2021

Related U.S. Application Data

(63) Continuation of application No. 16/676,151, filed on Nov. 6, 2019, now Pat. No. 10,891,154, which is a
(Continued)

(51) Int. Cl.
*G06F 9/48* (2006.01)
*G06F 9/455* (2018.01)
*G06F 9/50* (2006.01)

(52) U.S. Cl.
CPC ........ *G06F 9/4856* (2013.01); *G06F 9/45533* (2013.01); *G06F 9/45558* (2013.01);
(Continued)

(58) Field of Classification Search
None
See application file for complete search history.

(56) References Cited

U.S. PATENT DOCUMENTS 8,453,145 B1 * 5/2013 Naik .................. G06F 9/45537
718/1
8,898,668 B1 * 11/2014 Costea ..................... G06F 8/65
718/100

(Continued)

OTHER PUBLICATIONS

Lagar-Cavilla et al., "SnowFlock: Rapid Virtual Machine Cloning for Cloud Computing," Apr. 2009, ACM, p. 1-12. (Year: 2009).*
(Continued)

*Primary Examiner* — Qing Chen
(74) *Attorney, Agent, or Firm* — Van Pelt, Yi & James LLP

(57) ABSTRACT

At least a portion of a virtual machine is hosted on at least one node of a first subset of a plurality of nodes of a secondary storage system. The virtual machine comprises a plurality of portions that can be distributed between the plurality of nodes and is configured into a first state of a plurality of states, such that, in the first state, the plurality of portions is distributed between a first subset of the plurality of nodes and each of the first subset of nodes stores a portion of the virtual machine in its corresponding storage device. A node from the second subset of the plurality of nodes to host the virtual machine in a second state of the plurality of states is selected based on at least one of storage, memory or processing resources of one or more nodes of a second subset of the plurality of nodes.

16 Claims, 11 Drawing Sheets

Related U.S. Application Data continuation of application No. 16/389,201, filed on Apr. 19, 2019, now Pat. No. 10,503,543.

(60) Provisional application No. 62/800,717, filed on Feb. 4, 2019.

(52) U.S. Cl.
CPC .. *G06F 9/5088* (2013.01); *G06F 2009/45562* (2013.01); *G06F 2009/45583* (2013.01)

(56) References Cited

U.S. PATENT DOCUMENTS

| | | | |
|---|---|---|---|
| 8,930,539 B1* | 1/2015 | Rajaa | H04L 41/0816 709/226 |
| 9,286,104 B1 | 3/2016 | Ghosh | |
| 9,489,230 B1 | 11/2016 | Patwardhan | |
| 9,792,150 B1 | 10/2017 | Rangari | |
| 2006/0195715 A1 | 8/2006 | Herington | |
| 2008/0103728 A1 | 5/2008 | Archer | |
| 2008/0104588 A1* | 5/2008 | Barber | G06F 8/63 718/1 |
| 2008/0155169 A1 | 6/2008 | Hiltgen | |
| 2009/0007105 A1* | 1/2009 | Fries | G06F 8/65 718/1 |
| 2010/0017512 A1* | 1/2010 | Ciano | G06F 9/455 709/225 |
| 2010/0037089 A1 | 2/2010 | Krishnan | |
| 2010/0250868 A1 | 9/2010 | Oshins | |
| 2010/0251234 A1 | 9/2010 | Oshins | |
| 2011/0154331 A1* | 6/2011 | Ciano | G06F 9/45558 718/1 |
| 2012/0030407 A1 | 2/2012 | Pandey | |
| 2012/0254861 A1 | 10/2012 | Down, Jr. | |
| 2013/0239106 A1* | 9/2013 | Srinivasan | G06F 9/5077 718/1 |
| 2014/0007092 A1 | 1/2014 | Barbee | |
| 2014/0040887 A1* | 2/2014 | Morariu | G06F 9/45558 718/1 |
| 2014/0359054 A1 | 12/2014 | Kuznetsov | |
| 2015/0033220 A1 | 1/2015 | Venkat | |
| 2015/0161151 A1* | 6/2015 | Koryakina | G06F 9/45558 711/114 |
| 2015/0288758 A1 | 10/2015 | Ori | |
| 2015/0370502 A1* | 12/2015 | Aron | G06F 11/1456 711/162 |
| 2016/0026489 A1 | 1/2016 | Maislos | |
| 2016/0217010 A1 | 7/2016 | Krishnan | |
| 2016/0246628 A1* | 8/2016 | Litke | G06F 9/45558 |
| 2016/0266844 A1 | 9/2016 | Ogawa | |
| 2016/0274926 A1 | 9/2016 | Narasimhamurthy | |
| 2017/0255484 A1 | 9/2017 | Nakashima | |
| 2018/0004560 A1 | 1/2018 | Shankar | |
| 2018/0024850 A1* | 1/2018 | Caro Estevez | G06F 16/51 718/1 |
| 2018/0032362 A1 | 2/2018 | Buil | |
| 2018/0095846 A1 | 4/2018 | Sanakkayala | |
| 2018/0158535 A1 | 6/2018 | Kim | |
| 2018/0260119 A1* | 9/2018 | Atia | G06F 3/067 |
| 2018/0307517 A1 | 10/2018 | Devendran | |
| 2018/0329646 A1 | 11/2018 | Dai | |
| 2018/0336053 A1* | 11/2018 | Bernardini | G06F 8/63 |
| 2019/0034507 A1* | 1/2019 | Duttagupta | G06F 16/2246 |
| 2020/0192594 A1* | 6/2020 | Balachandran | G06F 3/0647 |

OTHER PUBLICATIONS

Filip Verloy "Building Automated Test/Dev Environments with Rubrik", Rubik.com, blog, Feb. 22, 2018. URL https://www.rubrik.com/blog/automation-test-dev-rubrik/ Retrieved on Jul. 25, 2019.

* cited by examiner

HOSTING VIRTUAL MACHINES ON A SECONDARY STORAGE SYSTEM

CROSS REFERENCE TO OTHER APPLICATIONS

This application is a continuation of U.S. patent application Ser. No. 16/676,151, entitled HOSTING VIRTUAL MACHINES ON A SECONDARY STORAGE SYSTEM, filed Nov. 6, 2019, now U.S. Pat. No. 10,891,154, which is incorporated herein by reference for all purposes, which is a continuation of U.S. patent application Ser. No. 16/389,201, entitled HOSTING VIRTUAL MACHINES ON A SECONDARY STORAGE SYSTEM, filed Apr. 19, 2019, now U.S. Pat. No. 10,503,543, which is incorporated herein by reference for all purposes, which claims priority to U.S. Provisional Patent Application No. 62/800,717, entitled HOSTING VIRTUAL MACHINES ON A SECONDARY STORAGE SYSTEM, filed Feb. 4, 2019, which is incorporated herein by reference for all purposes.

BACKGROUND OF THE INVENTION

As the rate of technology advancement increases, there is an ever increasing reliance on software and corresponding expectations of consistent, efficient and reliable software services. As a result, there is continual pressure to better manage and utilize an environment associated, either directly or indirectly, with the running of the software services in an efficient and cost-effective manner. In addition, there is pressure to reduce time to market for launching new software programs and providing fixes and updates to existing software programs without impacting any workloads.

It would be advantageous to provide an improved way of managing an environment associated with the storing and the running of a software service, for example, a virtual machine. It would also be advantageous to enhance workflows within the environment to enable the production of better-quality software.

BRIEF DESCRIPTION OF THE DRAWINGS

Various embodiments of the invention are disclosed in the following detailed description and the accompanying drawings.

DETAILED DESCRIPTION

Figure 1:
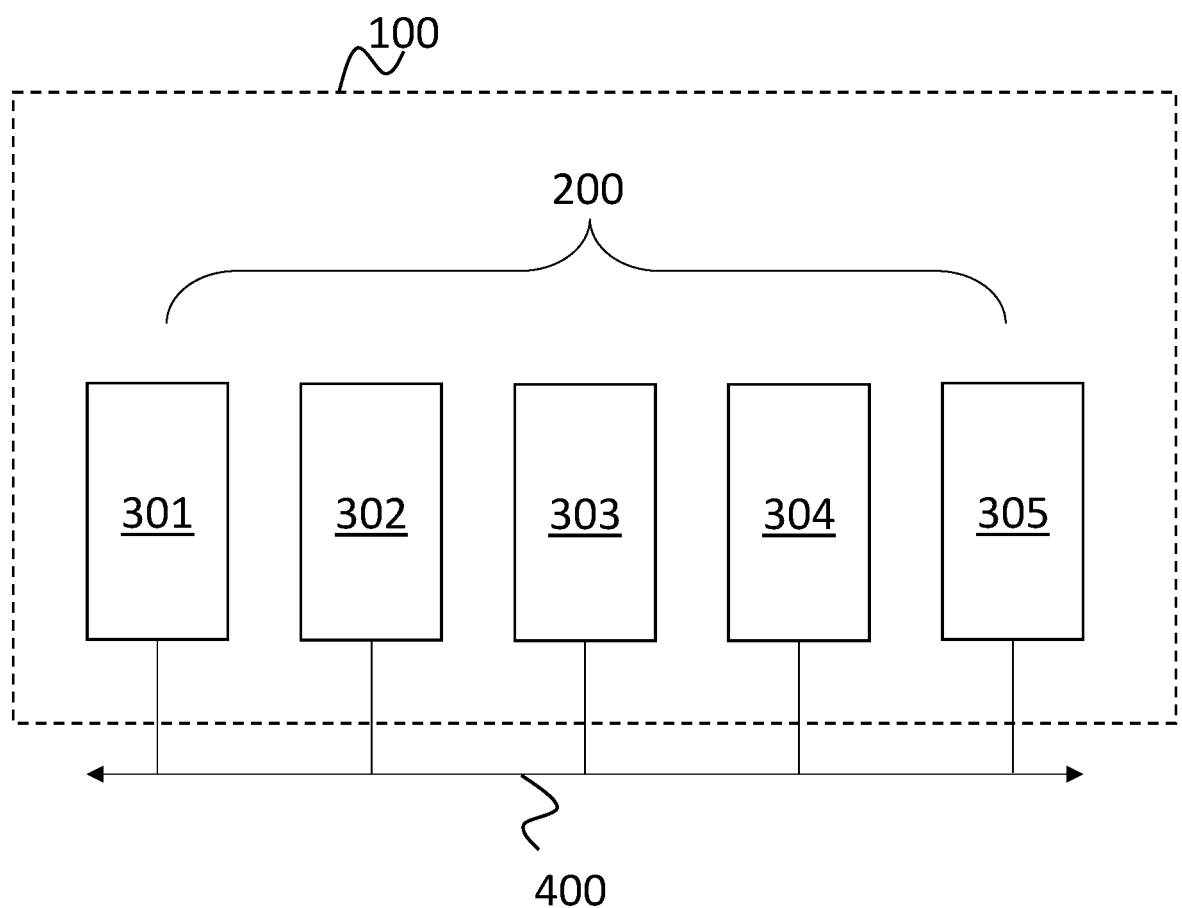
FIG. 1 is a schematic diagram of a computer storage system in accordance with some embodiments.

Embodiments described herein relate to a virtual machine environment and have particular, but not exclusive, application to systems and methods for running and managing a virtual machine infrastructure in a distributed state using distributed storage.

A system for managing a virtual machine in a secondary storage platform may include a computer cluster comprising a plurality of nodes. In some embodiments, the virtual machine is backed up from a primary system to the secondary storage platform. In other embodiments, the virtual machine is imported to the secondary storage platform from another secondary storage platform. In other embodiments, the virtual machine is imported to the secondary storage platform from a cloud environment. The virtual machine may be an application virtual machine configured to run one or more applications.

Each node may include a storage device, a memory, and at least one computer processor. Each node may host a hypervisor. A controller may be associated with the computer cluster. The controller and hypervisor of each node may be capable of coordinating access by the virtual machine to data stored in at least one of the storage device and memory of the respective node. The virtual machine may be comprised of a plurality of portions that can be distributed between the plurality of nodes and may be configured into a first state of a plurality of states, such that, in the first state, the plurality of portions is distributed between a first subset of the plurality of nodes and each of the first subset of nodes stores a portion of the virtual machine in its corresponding storage device. The controller may be capable of selecting a node from a second subset of the plurality of nodes to run the virtual machine in a second state of the plurality of states, where the virtual machine is distributed between the second subset of the plurality of nodes, based on at least one of storage, memory and processing resources across the nodes of the second subset. In some embodiments, the node is selected based on an affinity between the virtual machine and the selected node. For example, the virtual machine may require a node to meet certain performance metrics (e.g., available storage space, available memory, available processing resources, etc.). A node may be selected in the event the node is capable of satisfying the required performance metrics associated with the virtual machine. For example, a node that does not have the required processing resources for the virtual machine would not be selected while a node that does have the required processing resources for the virtual machine would be selected. In other embodiments, the node is selected based on an affinity between the virtual machine and one or more other virtual machines running on the selected node. For example, one or more other virtual machines may be running corresponding applications on the selected node that are related to an application hosted on the virtual machine. The node may be selected because the virtual machine is configured to run an application that is related to the one or more other applications running on the one or more other virtual machines hosted on the selected node. The controller may be further capable of co-operating with the hypervisors of the second subset of the plurality of nodes to provide access by the virtual machine to data stored in the storage devices of the second subset of the plurality of node. The selected node may host the virtual machine in the second state, i.e., the selected node may be capable of running the virtual machine in the second state (e.g., the selected node runs the executable portion of the virtual machine).

A computer cluster may be comprised of a plurality of nodes. Each node of the computer cluster may have a storage device, a memory, and at least one computer processor. A virtual machine may be comprised of a plurality of portions that are distributed between the plurality of nodes. The virtual machine may be configured into a first state of a plurality of states, such that, in the first state, the plurality of portions is distributed between a first subset of the plurality of nodes and each of the first subset of nodes stores a portion of the virtual machine in its corresponding storage device. A computer-implemented method of managing the virtual machine configured in the computer cluster may include selecting a node from a second subset of the plurality of nodes to run the virtual machine in a second state of the plurality of states where, providing access by the virtual machine to data stored in the storage devices of the second subset of the plurality of nodes, and running the virtual machine in the second state on the selected node. The virtual machine may be distributed between the second subset of the plurality of nodes, based on at least one of storage, memory and processing resources across the nodes of the second subset.

In some embodiments, the first and second subsets of nodes may be the same as each other or different from one another or contain at least one node that is the same.

The distributed states (first and second) of the virtual machine means that the virtual machine is much less likely to be killed off if the processing or memory resources on a node change (for example, causing an out of memory 'OOM' scenario) or if then node is under service or maintenance because executables of the virtual machine along with the virtual machine can be transferred between nodes (or launched from a different node if duplicated across the nodes).

The selection, by the controller, of a node to run the virtual machine may allow the controller to determine an optimal way of running the virtual machine in the cluster, which improves the resiliency of the virtual machine because the controller determines which nodes store and run the virtual machine based on the processing, memory, and storage requirements of the virtual machine relative to the capacity of the nodes.

The running of the virtual machine in the second state by the selected node can, in certain embodiments, may be understood to mean that the storage component of the selected node is not required to have capacity to store all data or all the executables of the virtual machine, making the in-memory running of the virtual machine more flexible within the cluster. That is, the executables of a virtual machine may be able to run in memory of a selected node without movement of the data operated upon by the executables of the virtual machine and stored in one or more storage components of respective nodes to the selected node: the data can remain distributed between said storage components of respective nodes of the cluster.

The storing and running of the virtual machine by the computer cluster can, in certain embodiments, may be understood to mean that there is no need for nodes outside of or remote from the computer cluster to run the virtual machine, so network traffic is reduced and the need for an additional computer for running the virtual machine is avoided.

FIG. 1 is a schematic diagram of a computer storage system 100 in accordance with some embodiments. The computer storage system 100 comprises a computer cluster 200 that consists of a plurality of nodes 301-305. Each of the plurality of nodes is connected to a network 400.

The computer storage system 100 may be a so-called secondary storage system, and in some embodiments, a hyperconverged secondary storage system, that provides secondary storage services, such as backup, to one or more other computer systems, such as a primary computer system. For example, a primary computer system may operate in a production environment. In some cases, a primary computer system may provide services to a number of client computers. A snapshot or view of the primary computer system may be created and stored as backup data in the storage system 100. As an example, the storage system 100 may be a non-production system, a failover system (sometimes called a standby system, both being systems that can be partially or fully promoted to a primary system if required), or a supplemental operations system capable of operating on the data that is stored therein. Accordingly, the storage system 100 can hold a state of data of the primary system at a particular point in time that can be restored to the primary system if needed. In addition, the backup data may be exposed to applications such as: analytics applications and/or test and development applications. In one example, the storage system 100 may organize the backup data in a tree structure such as a SnapTree™, described in Assignee's U.S. patent application Ser. No. 14/309,869, the entire contents of which are incorporated herein by reference.

Figure 2:
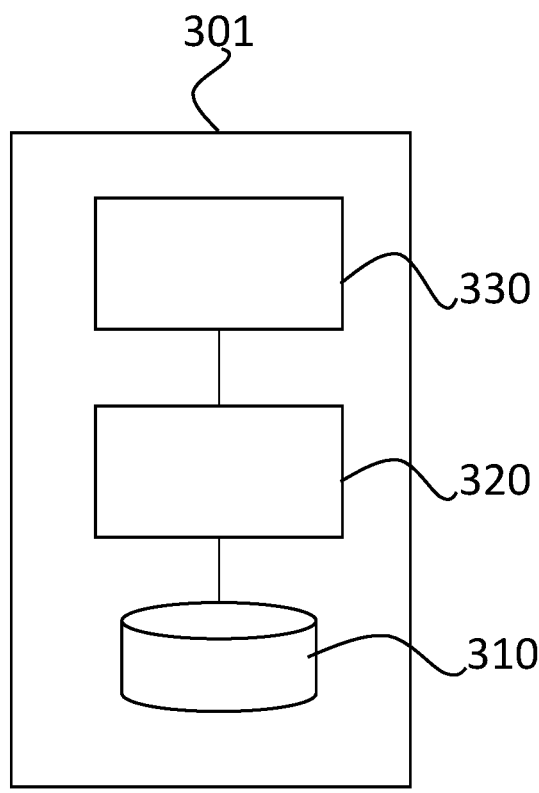
FIG. 2 is a schematic diagram of hardware architecture of a computer node in accordance with some embodiments.

FIG. 2 depicts a node 301 of the computer cluster 200 of FIG. 1 in accordance with some embodiments. Specifically, FIG. 2 shows at least a portion of the hardware architecture of the node 301, which may be also applicable to the other nodes 302-305 of the cluster 200.

The node 301 may be comprised of a storage device 310, a memory 320 and at least one computer processor 330, which are communicatively coupled to one another as is known in the art. A backup of data from a primary system may be stored in the storage device 310 and loaded into the memory 320 when a process executed by the computer processor 330 requests access to the data stored thereon. The storage device 310 may be a Solid-State Drive (SSD) or a Hard Disk Drive (HDD).

Figure 3:
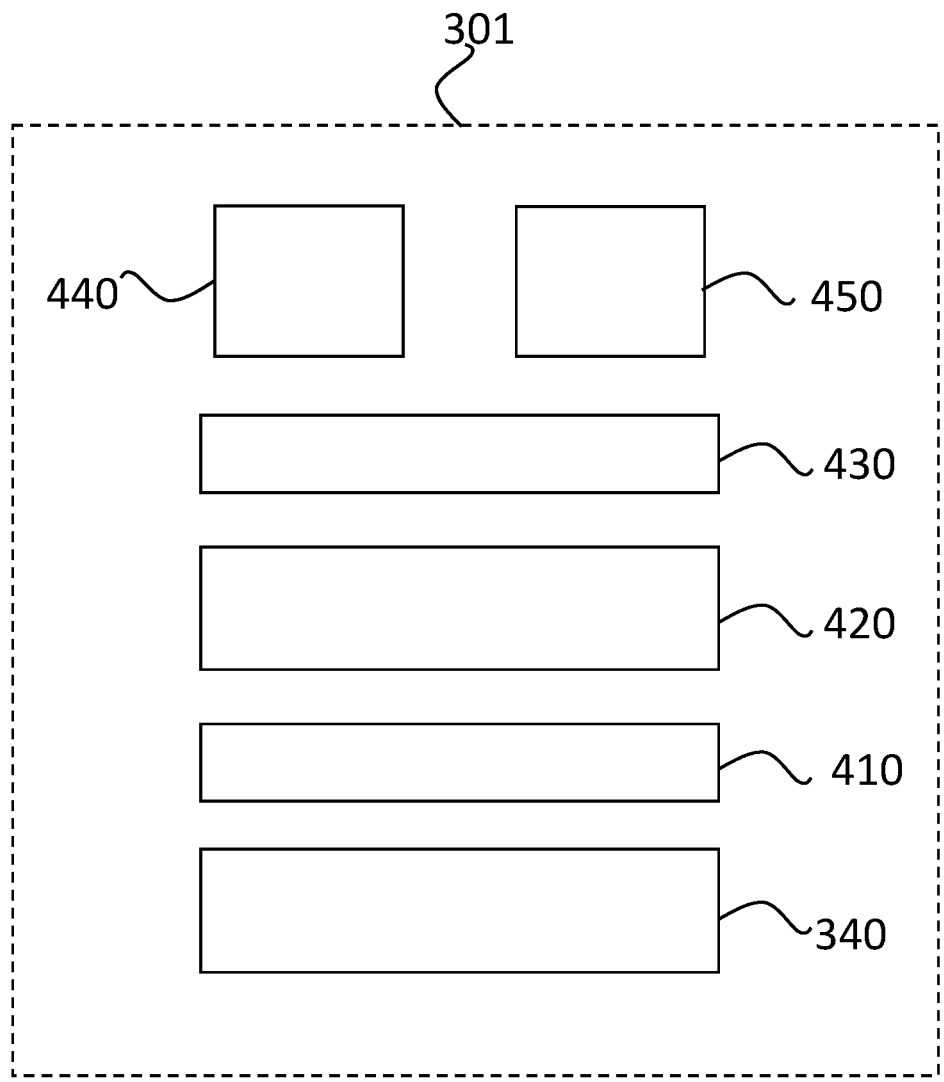
FIG. 3 is a schematic diagram of software architecture of a computer node in accordance with some embodiments.

FIG. 3 depicts the software architecture of a computer node in accordance with some embodiments, such as computer node 301, which is also applicable to the other nodes 302-305 of the cluster 200. In FIG. 3, the underlying hardware components of the node 301 (described in relation to FIG. 2) are collectively depicted as the component 340.

A controller 430 and a hypervisor 420 may be configured to manage at least one client virtual machine (VM) or a portion thereof, such as the client VM 450 (alternatively referred to as a guest virtual machine). In one example, multiple VMs may be supported on a single node, and in other examples, to be described in more detail below, any given VM may have its data storage distributed over more than one node.

The client VM 450 may correspond to a backup of a VM (or a portion of a VM), specifically, a backup of data of the VM, running on a primary computer system. In some embodiments, the client VM 450 may be a clone of a backup, so that any changes to the client VM that result from applications to which the cloned client VM is exposed, are independent from the backup, thereby preserving the integrity of the backup. In some embodiments, a cloned client VM has the same distribution of data and executables amongst storage components of nodes of a computer cluster as the backed up VM of which it is a clone.

The client VM 450 may comprise data and executable processing elements. In some embodiments, the data may comprise at least some of the following: configuration data; specification data; a database; data associated with applications and the operating system of the client VM, and new data generated from execution of the executable processing elements, such as data generated from the running of the client VM. In some embodiments, the executable processing elements of the client VM comprises at least some of the following: application executables; and operating system executables.

The controller 430 is a software component that controls the hypervisor 420 and may be configured to cooperate with controllers and hypervisors of other nodes to form a distributed system that stores and runs one or more client VMs. Accordingly, the controller 430 may be regarded as an orchestration component with a purpose of scheduling the storing and running of virtual environments, comprising one or more client VMs, within the computer cluster 200.

As such, the controller 430 can rapidly create (spin up) and/or destroy (tear down) virtual environments using the nodes 301-305 of the computer cluster 200, as will be explained in detail below.

First, a general description of a hypervisor, in particular hypervisor 420 of FIG. 3 will be provided. In some embodiments, as is known in the art, the hypervisor 420 may execute at a layer of abstraction above an operating system 410 of the node, sometimes referred to as a host operating system, and may co-ordinate calls to the hardware 340 through the operating system 410. In particular, the hypervisor 420 may co-ordinate access to data stored in the memory component and/or the storage component of the node 301.

Accordingly, in some embodiments, the hypervisor 420 operates as a Type 2 hypervisor and may be a Kernel-based Virtual Machine (KVM) hypervisor. The operating system 410 may be a Linux operating system, such as CentOS.

In some embodiments, the hypervisor 420 may be a Type 1 hypervisor, such as a VMware ESXi hypervisor. In such a scenario, the hypervisor would comprise the host operating system, rather than being a software application installed on the operating system (as in FIG. 3).

In addition to the mentioned client VM 450, an application or further VM may be running on the node 301, such as host VM 440, as part of other operations or systems using resources of the computer cluster 200. Accordingly, the resources of the node 301, such as the computing, memory, and storage resources may be assigned to both the client VM 450 and host VM 440 and there may be excess ("free") resources left over. Any resources that are not assigned to either the client VM 450 or the host VM 440 may be free resources or consumed by other applications and/or processes running on the node. Such resources can be dynamically managed internally to the node or cluster and consequently assigned (in some examples, only a portion of the so-called resources is assigned) to one or both of the client VM 450 or host VM 440 to support the storing and/or running of the same. If a node has excess computing resources than are used for these two VMs the node may be said to be a compute-heavy node, while if a node has excess memory resources than are reserved for those two VMs the node may be said to be a memory-heavy node. In addition, if a node has excess storage resources the node may be said to be a storage-heavy node.

Each of the nodes 301-305 may have different levels of excess processing, memory, and storage resources depending on whether the node is already running or holding in memory another client VM or application, and/or VM of the host, and/or other applications and operations consuming resources on the node, such as an ongoing backup operation or analytics program. In some embodiments, a node with a suitable amount of resources will be selected to run the client VM 450.

The client VM 450 may communicate with the hypervisor 420 in accordance with a communications protocol, for example, via Internet Small Computer System Interface (iSCSI) requests or using network file system (NFS) requests. In some embodiments, the data stored as part of the client VM 450 and exchanged between client VM 450 and the hypervisor 420 may undergo format conversion to enable an operating system of the client VM 450 to run in the environment of the hypervisor 420 at a sufficient speed and level of efficiency. In some embodiments, such a format conversion may involve inserting drivers, compatible with the hypervisor 420, into the client VM 450.

Figure 4:
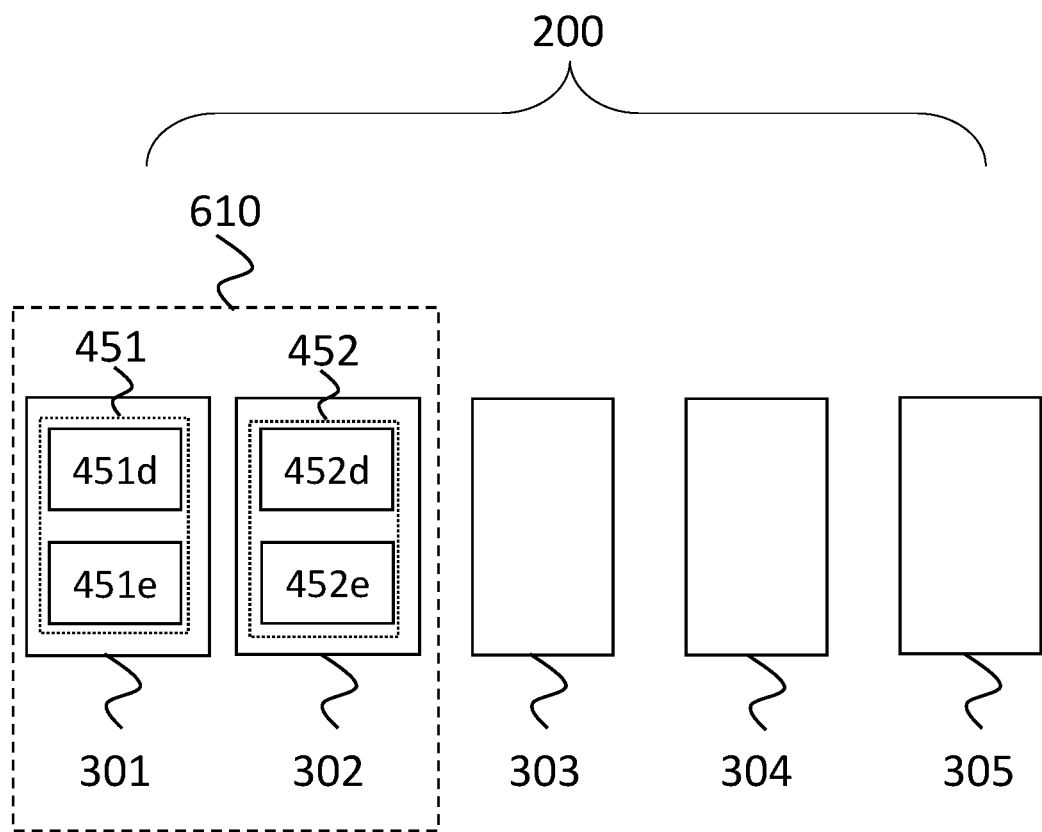
FIG. 4 is a schematic diagram of a virtual machine configured within a computer cluster in accordance with some embodiments.

FIG. 4 is a simplified illustration that depicts the client VM 450 of FIG. 3 configured within the computer cluster 200 according to an embodiment. In this example the client VM 450 has a plurality of portions 451, 452 distributed between at least some of the plurality of nodes 301-305, and can be configured into a plurality of states. More particularly, in this example portion 451 has a part 451*d* comprising data of the client VM 450 and another part 451*e* comprising executables of the client VM 450. The portion 452 has a part 452*d* comprising data of the client VM 450 and another part 452*e* comprising executables of the client VM 450.

In a first state, the client VM 450 is distributed between a first subset 610 of the plurality of nodes 301-305. Specifically, in the example of FIG. 4, a first portion 451 of the client VM 450 is stored on a first node, node 301, and a second portion 452 of the client VM 450 is stored on a second node, node 302. The first and second nodes 301, 302 store the corresponding portions 451, 452 (and parts 451*d,e*, 452*d,e* thereof) of the client VM 450 in their respective storage devices, which may be storage devices as described above with reference to FIG. 2. As such, the term "distributed" is used in a broad sense to describe that at least one portion 451 of the client VM 450 is stored on a node that is different to the node(s) on which the other portions 452 of the client VM 450 are stored. In addition, the term "state" is used to describe a point in time distribution of the client VM 450, where a change in state of the client VM 450 may results from movement of one or more data and/or executable parts between storage components of nodes.

Thereafter, the controller 430 of FIG. 3 may select a node from a second subset of the plurality of nodes 301-305 to run the client VM 450, specifically, to execute the executables of the client VM 450, in a second state, based on at least one of storage, memory, and processing resources across the nodes of the second subset. This selection may be triggered by changes to resource availability of the nodes 301-305. Generally, in the second state, the data parts 451*d* and 452*d* of the client VM 450, which may include executable binaries and data accessed by these executable binaries, remain distributed between different storage components of nodes of the cluster 200, such as the nodes of the second subset (for example, nodes 301 and 302 of the subset 610 described in relation to FIG. 5), whereas, in order to run the client VM 450, the executables parts 451*e*, 452*e* are loaded into the memory 320 of the selected node (for example node 301 of the example described in relation to FIG. 5).

In some embodiments, the selection by the controller 430 of which node to run the client VM is dependent on a metric or condition associated with the storage system 100 or the cluster 200. Such a metric may be based on the number of views associated with the clone of the backed-up VM and stored in the cluster 200, where a view is a way to organise file system data corresponding to the backed-up VM and may be provided by a tree data structure, such as the SnapTree™, described in Assignee's U.S. patent application Ser. No. 14/309,869. In some embodiments, the metric may be based on the number of backup operations running on nodes within the cluster 200.

The second subset of nodes may comprise any of the nodes 301-305 of the cluster 200, even if the nodes formed part of the first subset 610.

Because the virtual machine such as client VM 450 is distributed over, and can be moved between, different nodes, the virtual machine is less sensitive to changes in available processing or memory resources for a given node (for example, causing an out of memory 'OOM' scenario) or when a given node is serviced or under maintenance because parts 451*d,e* and 452*d,e* of the virtual machine such as executable parts 451*e* and 452*e* and data parts 451*d* and 452*d* operated upon by the executables can be transferred between storage components of nodes, or can be launched from a memory component of a different node if duplicated across the storage components of the nodes.

This feature may be enabled by controller 430, which is able to determine a suitable configuration for the virtual machine in the cluster 200, and select a node accordingly. This then reduces the likelihood of the virtual machine being killed because the controller 430 determines which nodes store and run the virtual machine based on the processing, memory, and storage requirements of the virtual machine relative to the capacity of the nodes. Further, the controller 430 may be able to respond to changes in available resources of any given node so as to change the distribution of the VM client 450 within the cluster 200.

Advantageously, the storage component of the selected node is not required to have capacity to store all data and/or executables of the virtual machine, which means the running of the virtual machine is flexible within the cluster.

The storing and running of the virtual machine by the cluster means that there is no need for virtual machine data traffic outside the cluster to run the virtual machine, so network traffic may be lower than it would be if external servers were utilized.

In addition to selecting a node on which to run the client VM, the executable processing components of the controller 430 may provide the following:
- an application programming interface (API) with the host application or client VM 450
- functions for launching the client VM 450 on the selected node(s)
- functions for monitoring a launched client VM 450 and initiating online/offline movement of the client VM 450
- functions to collect statistics of a launched client VM 450
- functions to provide a graphical user interface for a launched client VM 450 functions to provide life cycle management for a launched client VM 450

This may enable the controller 430 to provide a stable environment in which the client VM operates within the computer cluster 200.

Once the client VM 450 is running in memory of the selected node, one or more operations such as test and development or analytical operations or specialized applications running within the client VM 450 may be performed. In this way, said operations may be native to the computer cluster 200 and thereby make use of hardware already being used to create and store backups of a primary system, so do not require external memory or computing resource, for example, from a cloud network. Any new data generated as part of the test and development or analytics operations or specialized applications running within the client VM 450 may be distributed across the two or more of the plurality of nodes 301-305, stored within the storage components of the same.

Figure 5:
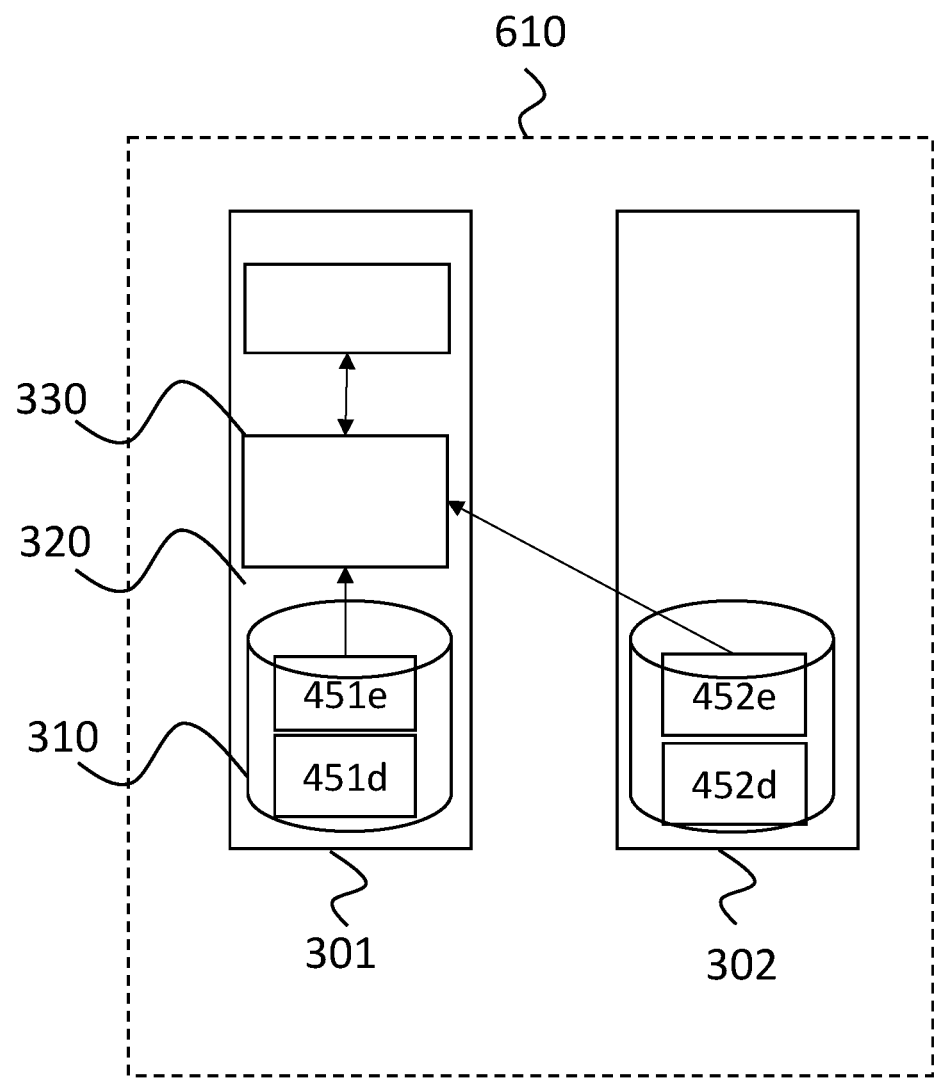
FIG. 5 is a schematic diagram of running a virtual machine on a computer node in accordance with some embodiments.

FIG. 5 is a simplified schematic diagram according to some embodiments, in which node 301 has been selected by the controller 430 to run the client VM 450 having portions 451 and 452. As such, in the example of FIG. 5 the second subset of nodes is the same as the first subset of nodes and there is no change of distribution of the client VM 450. In this example the controller 430 of the node 301 may cooperate with hypervisor of the node 302 to access the stored portion 452 of the client VM 450. The executable part 452*e* of the second portion 452 may be subsequently loaded directly into the memory component 320 of the node 301 from the storage component of the node 302. In addition, the executable part 451*e* of the first portion 451 may be loaded into the memory component 320 of the node 301 from the storage component of the node 301. In one example, the loading of the different portions of the client VM 450 into the memory of the node 301 may occur concurrently, sequentially or on-demand, depending on which portion is required first. In the example of FIG. 5, there is no movement of the data parts 451*d*, 452*d* of the respective portions 451, 452 of the client VM 450 from the storage components 310 in which the data parts 451*d* and 452*d* are stored. In this way, traffic between the nodes 301 and 302 is reduced. In another example, the first and second subsets of nodes may be the same and there may be movement of some data between the nodes.

The computer processor 330 of the node 301 may then access the memory 320 to execute the executables of the client VM 450 via parts 451*e* and 452*e* and thereby run the client VM 450.

It will be noted that in this example the executable part 452*e* of the second portion 452 is loaded into the memory 320 of the node 301 but it is not stored in the storage component 310 of the node 301. This may provide greater flexibility to the selection, by the controller 430, of which node can run the client VM 450, because the storage resource of a node does not act as a restriction on whether a given node can be used to run the client VM 450. This, in turn, provides greater flexibility in running the client VM 450 within the computer cluster 200 and reduces the likelihood that a client VM may fail due to out-of-memory (OOM) conditions.

The movement of at least the executable part 452*e* of the VM client 450 from the storage component 310 of one node 302 to the storage component 310 or memory component 320 of another node 301 may be referred to as moving the client VM 450 between nodes.

Figure 6:
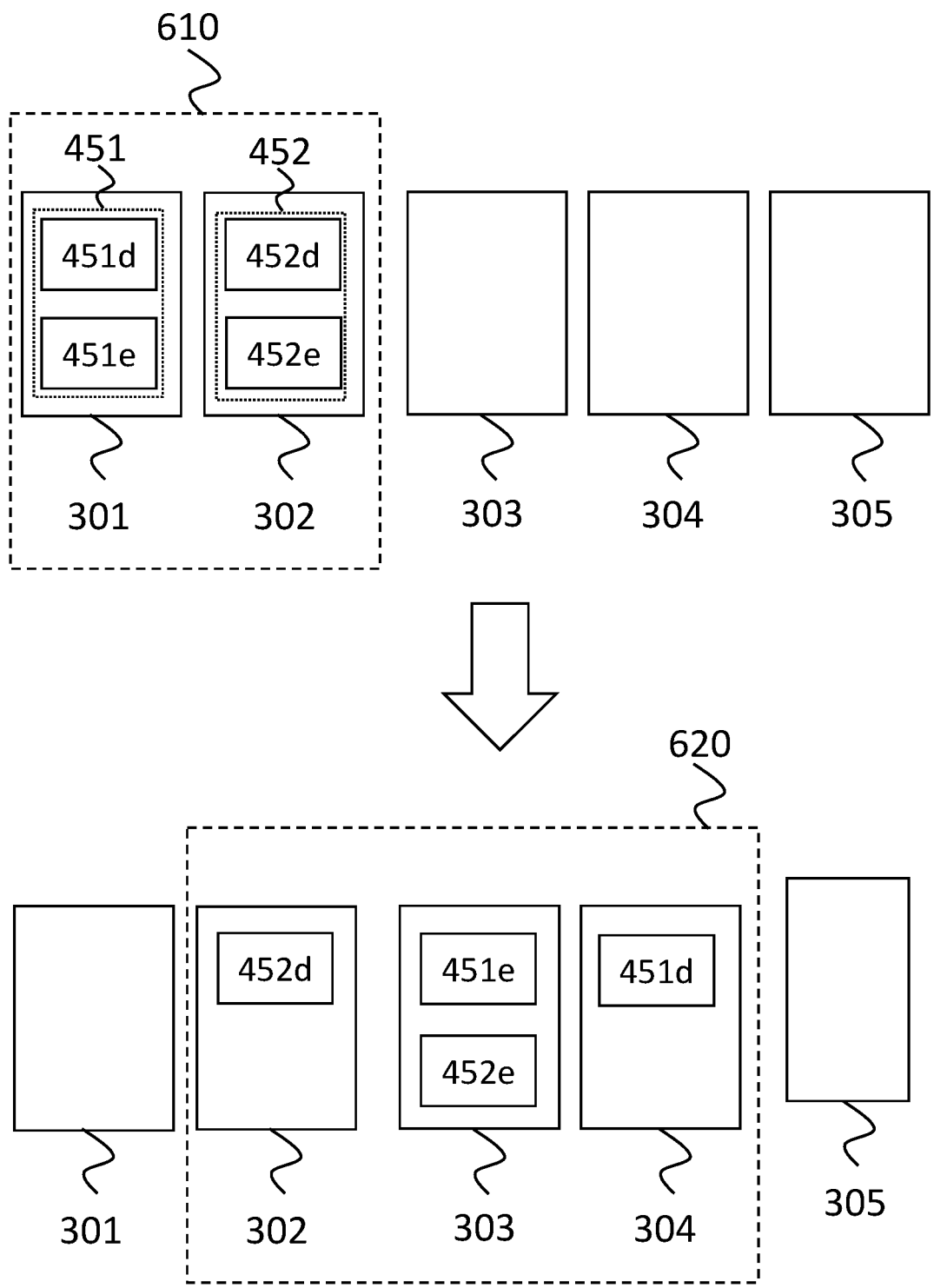
FIG. 6 is a schematic diagram of managing a virtual machine within a computer cluster in accordance with some embodiments.

FIG. 6 shows another embodiment, in which the first subset of nodes 610 that supports the client VM 450 in its first state is different to, but overlaps with, the second subset of nodes 620 that supports the client VM 450 in the second state. In this embodiment, in the first state the data and executables parts 451*d,e* and 452*d,e* of the client VM 450 are distributed between the storage components 310 of the nodes 301 and 302 and the client VM 450 is not in operation. The node 303 may then be selected by the controller 430 to run the client VM 450, which causes the executable parts 451e and 452e to be loaded into memory of the node 303 (in the same way as the node 301 of the example of FIG. 5 held both executable parts 451e, 452e in its memory). As such, in the embodiment of FIG. 6 the controller has selected a node outside of the first subset 610, and still within the computer cluster 200, to run the client VM 450.

As can be seen, in the second state the data parts 451d,e of the client VM 450 are distributed between the storage components 310 of the nodes 302 and 304, which together with the node 303 may form the second subset of nodes 620. Thus, in the example of FIG. 6 some of the data of the client VM 450 (that is, data part 451d) has moved between nodes of the computer cluster 200 (from node 301 to node 304) and the distribution of the client VM 450 has changed between the first and the second states.

Such a change of state as exemplified in FIG. 6 involves movement of executable parts 451e and 452e of the client VM 450 to the memory of node 303 and movement of some of the data parts, namely part 451d, to the storage component of node 304 from node 301. Whilst in the example of FIG. 6 the node 303 selected by the controller 430 to run the client VM 450 does not itself store the data parts 451d, 452d of the client VM 450 in its storage component 310, in another example the node selected to run the client VM 450 may also store one or more data parts 451d, 452d of the client VM 450.

Movement of data parts of a client VM may occur as a result of one or more of the following events: if an application attempts to access and/or amend the data; if the configuration of the cluster changes (for example, as a result of addition/removal of a node/storage component); to re-balance data between nodes of the cluster if there has been a node failure; and if new data has been created (that is, new writes to the client VM resulting in a change to the client VM) and requires storage in a particular node to balance data across the cluster.

The selection by the controller 430 may be based on the storage, memory, and processing resources of the nodes 302, 303, and 304 of the second subset 620. As an example, if the node 303 has more free computing resources than the node 304, the node 303 may be selected to run the client VM 450. In another example, the selected node may be selected based on a result of one or more filters being applied to the nodes of the second subset, where the one or more filters specify a predetermined processing and/or memory capacity for a node to run the VM 450.

Movement of the executable processes of the client VM 450 between different nodes may occur in response to changes in memory, storage and/or processing capacity of a node on which a portion of the VM is stored. Movement of the executable processes of the client VM 450 between different nodes may occur in response to a trigger condition. Trigger conditions may include: an out-of-memory condition that deems current node running the client VM is unsuitable, a change in operational condition such as a routine maintenance check, an upgrade, failure or predicted failure of a node, insertion or predicted insertion of a new node into the cluster, etc. Movement of the executable processes of the client VM 450 between different nodes may occur to balance loads between the plurality of nodes. Movement of the executable processes of the client VM 450 between different nodes may occur based on a round robin assignment of executables between nodes. In all of the aforementioned examples, the controller may be capable of initiating dynamic movement of the client VM 450 as conditions change in the cluster 200.

Indeed, the movement of one or more portions of the client VM 450 between nodes of the cluster may result from a load balancing exercise within the cluster 200, whereby substantially equal computing and memory resources are used by each node of the cluster 200.

In a situation in which a node fails, the controller 430 may determine that the virtual machine VM 450 has stopped running on the selected node, select another node of the second subset to run the virtual machine based on at least one of storage, memory and processing resources across the other nodes of the second subset; and restart the virtual machine on the other node by loading the executables of the VM 450 into the memory of the other node.

Figure 7:
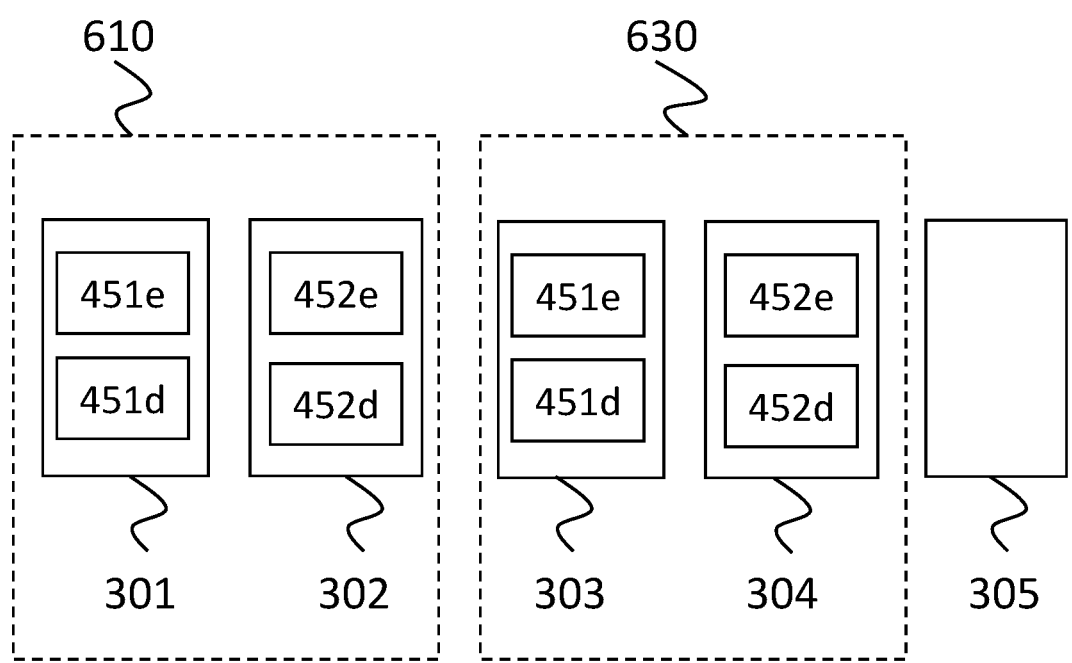
FIG. 7 is a schematic diagram of managing a virtual machine within a computer cluster in accordance with some embodiments.

FIG. 7 shows another example of a distributed VM 450 for which a second subset of nodes 630 is different to, and has no overlap with, the first subset of nodes 610. Specifically, the nodes 301 and 302 form the first subset 610 and the nodes 303 and 304 form the second subset 630. In more detail, the data parts 451d and 452d and the executable parts 451e and 452e of the client VM 450 have moved from the storage components 310 of nodes 301 and 302 to the storage components 310 of the nodes 303 and 304. In this scenario, and as will be appreciated from the previous examples, the controller 430 may then selects one of the nodes 303, 304 to run the client VM 450. This selection may be based on at least one of the storage, memory, and processing resources of the nodes 303, 304 of the second subset 630. As an example, if the node 303 has more memory resource than the node 304, the node 303 may be selected to run the executable parts 451e and 452e of the client VM 450 and to enable this to happen the executable part 452e may be moved to the memory 320 of the node 303 so that the processing component of the node 303 has access to both executable parts 451e and 452e of the client VM 450.

Figure 8:
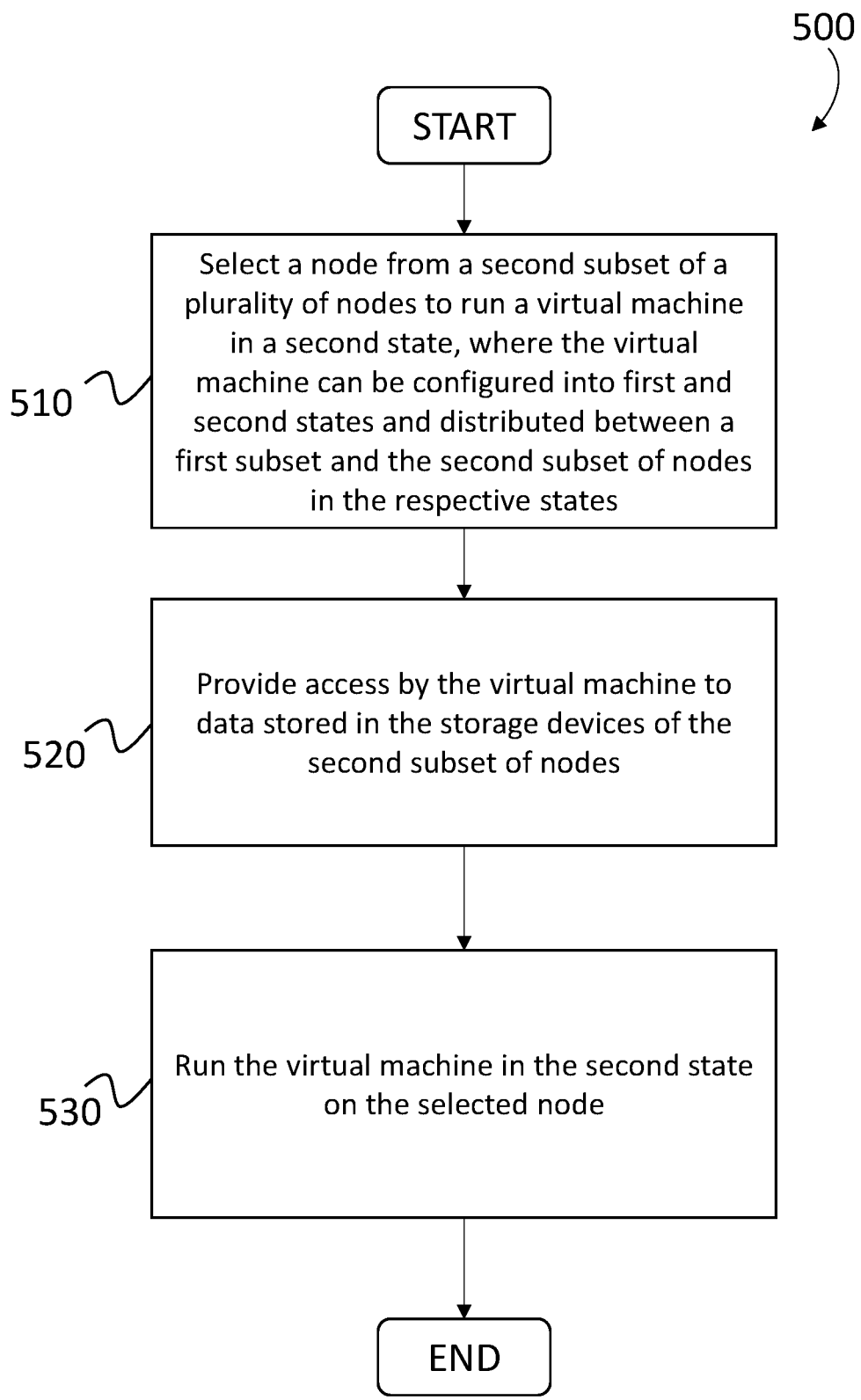
FIG. 8 is a flowchart of a method of managing a virtual machine in accordance with some embodiments.

FIG. 8 is a flowchart of a method 500 of managing a virtual machine in accordance with some embodiments. The method 500 may be described in relation to the client VM of FIGS. 1-7, where the client VM is configured in a computer cluster comprising a plurality of nodes, each node of the computer cluster having a storage device, a memory, and at least one computer processor. The virtual machine may be comprised of a plurality of portions that are distributed between the plurality of nodes and the virtual machine can be configured into a first state of a plurality of states, such that, in the first state, the plurality of portions is distributed between a first subset of the plurality of nodes and each of the first subset of nodes stores a portion of the virtual machine in its corresponding storage device.

The method 500 starts, at block 510, with selecting a node from a second subset of the plurality of nodes to run the virtual machine in a second state of the plurality of states, whereby in the second state the virtual machine is distributed between the storage devices of the second subset of the plurality of nodes. The selecting may be based on at least one of storage, memory and processing resources across the nodes of the second subset. The selecting may be based on a comparison by the controller of at least one of storage, memory and processing resources across the nodes of the second subset to criteria of the same for the virtual machine 450.

Next, the method 500 proceeds to block 520 where access to data stored in the storage devices of the second subset of nodes is provided to the virtual machine. As an example, access may be provided by loading the executables of the virtual machine stored in the storage devices of the second subset of nodes into the memory of the selected node.

After block 520, at block 530, the virtual machine runs in the second state on the selected node.

Figure 9:
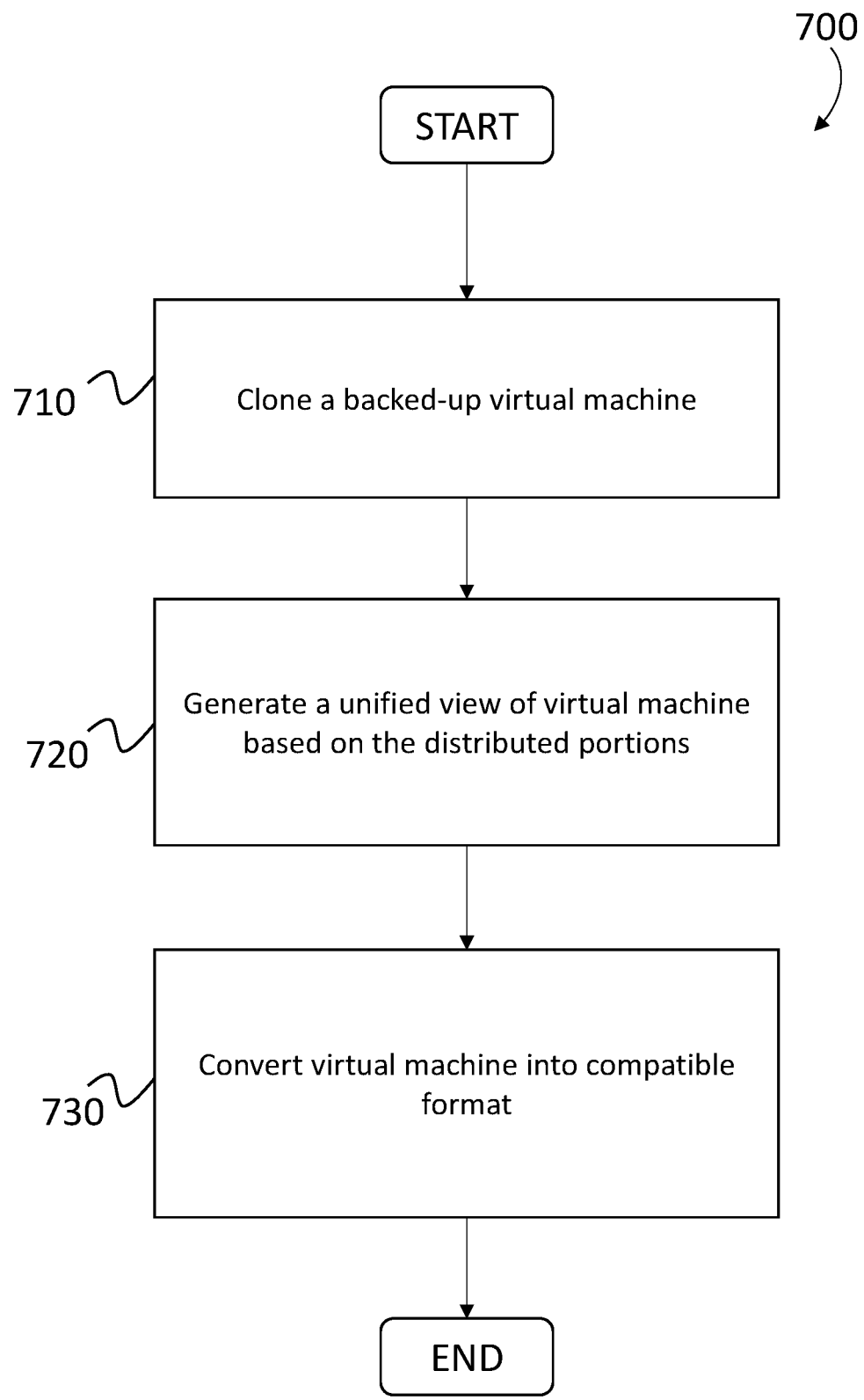
FIG. 9 is a flowchart of a method of managing a virtual machine in accordance with some embodiments.

FIG. 9 is a flowchart of a method 700 of managing a virtual machine in accordance with some embodiments. The method 700 precedes the method 500 described in relation to FIG. 8. The method 700 is described in relation to the client VM of FIGS. 1-7.

The method 700 starts at block 710 where a backed-up virtual machine, which is distributed between a plurality of nodes of the computer cluster, is cloned. Next, at block 720, the distributed portions of the cloned virtual machine are used to generate a unified view of the data of said virtual machine. The unified view of the virtual machine may be generated by the controller 430, which, when implemented as a distributed component over the various nodes of the computer cluster 200, involves cooperation between the controllers 430 of each node. The unified view enables the memory and computing resources criteria of the virtual machine to be derived, and this then forms the basis of the selection of block 510 of FIG. 8.

At block 730, the cloned virtual machine is converted into a format that is compatible with the hypervisor of the nodes. As an example, the cloned virtual machine may be converted into the KVM format so that the virtual machine is able to run efficiently on a node of the computer cluster.

Figure 10:
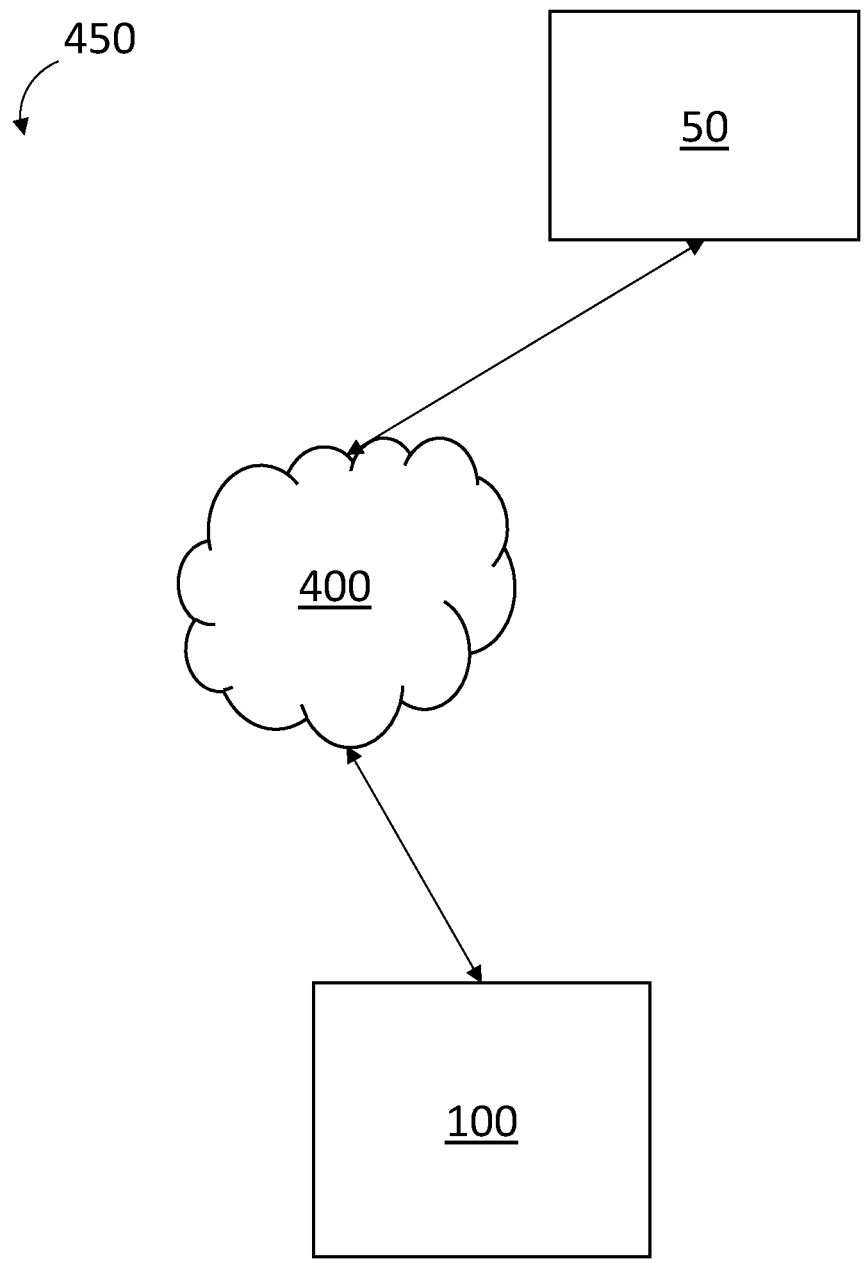
FIG. 10 is a schematic diagram of a storage network in accordance with some embodiments.

FIG. 10 is a schematic diagram of a system 450 that manages a virtual machine environment for performing test and development operations within which embodiments disclosed herein operate. The system has a primary computer system 50 and a computer storage system 100 (as described in relation to FIG. 1), which may be referred to as a secondary storage system. The storage system 100 may provide backup services to the primary computer system 50. The primary computer system 50 and the secondary computer storage system 100 are coupled to one another via a network 400. Both the primary computer system 50 and the secondary computer storage system 100 may be located on a client/user site. In another example, one or both may be remotely located on the client/user site. In an alternative embodiment, the primary computer system 50 and the computer storage system 100 may be integrated, without a network there between.

In one embodiment, the secondary computer storage system 100 is configured with a controller that is able to control the orchestration of a plurality of VMs, where a group of VMs can be thought of belonging to a single application. These VMs may be deployed in an application-aware manner by the controller.

In another embodiment, the controller may have the capability to control when the VM is launched and how long the VM will run for before tearing it down.

In some embodiments, incremental backups of the VM may be stored, and a specific point in time version of the VM may be deployed for test and development purposes.

In addition, the controller may be able to promote a test and development VM as a so-called "good copy", for example, if the tested VM version can itself can be deployed into production, the controller can restore it back to the original source, that is a primary computer system, such as an ESX server or it may be promoted and operate on the secondary system.

Prior to a client VM going offline (e.g., failing due to OOM conditions), the memory component of a node on which the client VM is hosted may store one or more stale write operations. A stale write operation may be an operation that is stored in a memory of a node, but has yet to be committed to a volume of a VM. A stale write may be unable to be performed because the client VM to which the write operation is associated went offline prior to the write operation being performed. For example, node 301 hosting client VM 450 may receive one or more write operation requests. Node 301 hosting client VM 450 may store the one or more write operation requests in memory component 320 prior to performing the one or more write operations.

As discussed above, the executable portion of a client VM and/or a data portion of the client VM may be moved from a first node to a second node. The client VM running on the second node is a new instance of the client VM. The volume of the client VM may be cloned and the new instance of the client VM may be associated with the cloned volume. The new instance of the client VM may become corrupted in the event it is associated with the volume of the client VM because stale write operations may be applied to the new instance of the client VM.

Figure 11:
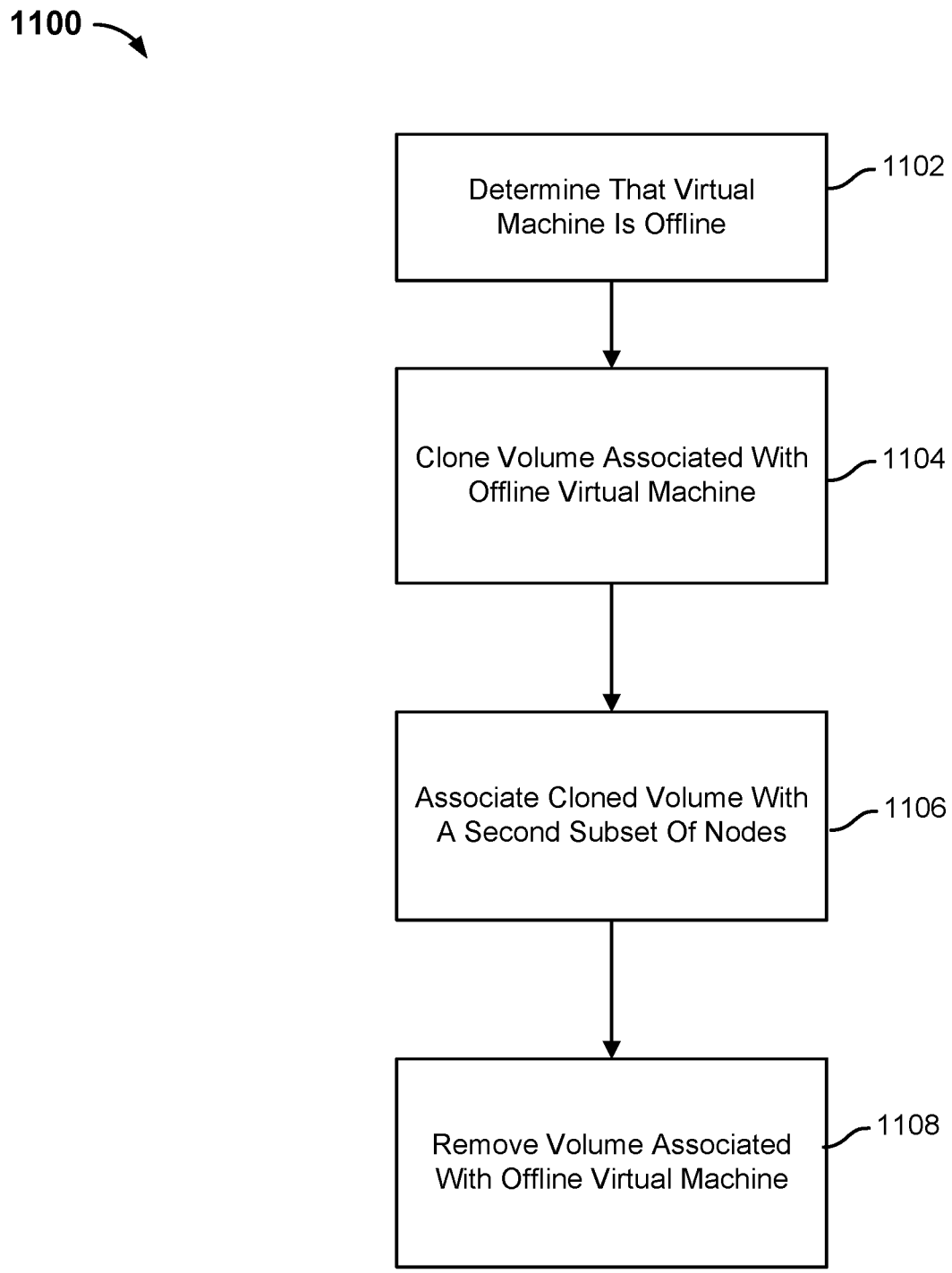
FIG. 11 is a flow chart illustrating an embodiment of a process for preventing a new instance of a virtual machine from becoming corrupted by stale writes.

FIG. 11 is a flow chart illustrating an embodiment of a process for preventing a new instance of a virtual machine from becoming corrupted by stale writes. In the example shown, process 1100 may be implemented by a computer cluster, such as computer cluster 200.

At 1102, it is determined that a virtual machine is offline. A virtual machine may fail for one or more reasons. For example, a virtual machine may fail due to out-of-memory conditions. A virtual machine may be determined to be offline based on a heartbeat signal. For example, a virtual machine may be configured to periodically provide a processor of a node a heartbeat signal. In the event the processor of the node does not receive the heartbeat signal within a threshold period of time, the virtual machine may be determined to be offline. A virtual machine may be determined to be offline in the event a file operation (e.g., read/write operation) to the virtual machine is unable to be performed. In some embodiments, a virtual machine is determined to be offline in the event a threshold number of file operations (e.g., read/write operation) associated with the virtual machine are unable to be performed. A memory associated with the virtual machine may store one or more stale operations associated with the offline virtual machine.

At 1104, a volume associated with the offline virtual machine is cloned. A volume may correspond to a file associated with a tree data structure (e.g., Snaptree) stored by the storage system. The tree data structure may include a sub-tree (e.g., "binary large object (BLOB)," "file metadata tree", "file metadata structure") that includes a file that corresponds to a virtual machine volume. The sub-tree may include a root node, one or more levels of intermediate nodes, and a plurality of leaf nodes. The volume associated with the virtual machine may be associated with a first sub-tree included in the tree data structure. The volume associated with the virtual machine may be cloned by cloning a root node of the sub-tree corresponding to the volume associated with the offline virtual machine. The root node clone includes the same pointers as the root node that was cloned, but may include a different node identifier and a different view identifier. The cloned volume may be associated with a second sub-tree included in the tree data structure. The cloned volume is associated with a new instance of the virtual machine.

At 1106, the cloned volume is associated with a second subset of nodes. The cloned volume is comprised of a data portion of the virtual machine and an executable portion of the virtual machine. The clone volume may be a distributed volume that is stored across the second subset of nodes. The virtual machine may be hosted on a selected node included in the second subset of nodes and the executable portion of the virtual machine may be run on the selected node. In some embodiments, the executable portion of the virtual machine is moved from first subset of nodes to the selected node included in the second subset of nodes and loaded into a memory of the selected node.

At 1108, the volume associated with the offline virtual machine is removed. A memory of the node on which the offline virtual machine is hosted may store one or more stale writes (e.g., one or more write operations that were not applied to the offline virtual machine). A processor of the node on which the offline virtual machine is hosted may be configured to apply the one or more writes stored in the memory of the node to the volume associated with the offline virtual machine, i.e., applied to the sub-tree associated with the offline virtual machine. To prevent the cloned volume from being corrupted with one or more stale writes associated with the offline virtual machine, the volume associated with the offline virtual machine may be removed. The volume associated with the offline virtual machine may be removed by removing a root node from the sub-tree corresponding to the volume associated with the offline virtual machine.

In some embodiments, step 1108 is performed after step 1106 is completed. In other embodiments, step 1108 is performed while step 1106 is being performed. In other embodiments, step 1108 is performed before step 1106 is performed.

In some embodiments, a system for managing a virtual machine is comprised of a computer cluster comprising a plurality of nodes. Each node may be configured with a storage device, a memory, and at least one computer processor. Each node may host a hypervisor. The system may further comprised of a controller associated with the computer cluster. The controller and hypervisor of each node may be capable of coordinating access by the virtual machine to data stored in at least one of the storage device and memory of the respective node. The virtual machine may be comprised of a plurality of portions that can be distributed between the plurality of nodes and may be configured into a first state of a plurality of states, such that, in the first state, the plurality of portions is distributed between a first subset of the plurality of nodes and each of the first subset of nodes stores a portion of the virtual machine in its corresponding storage device. The controller may be capable of selecting a node from a second subset of the plurality of nodes to run the virtual machine in a second state of the plurality of states where the virtual machine is distributed between the second subset of the plurality of nodes, based on at least one of storage, memory and processing resources across the nodes of the second subset. The controller may be further capable of co-operating with the hypervisors of the second subset of the plurality of nodes to provide access by the virtual machine to data stored in the storage devices of the second subset of the plurality of nodes and the selected node may be capable of running the virtual machine in the second state. The selected node may be capable of receiving at least one change to the virtual machine as part of one or more test and development operations and storing new data resulting from the at least one change as a portion of the virtual machine in at least one of the plurality of nodes of the second subset. The virtual machine may be a clone of a backed-up virtual machine, such that any change made to the virtual machine as a result of one or more test and development operations is independent of the backed-up virtual machine. The controller may be further capable of comparing the at least one of storage, memory and processing resources across nodes of the second subset to criteria of the same for the virtual machine. The at least one of storage, memory and processing resources criteria of the virtual machine may be derived from a unified view of the machine generated by the controller. The controller may be further capable of determining that at least one of the memory and processor of the selected node has met a related condition and selecting another node of the second subset to run the virtual machine as a result of a determination. The related condition may be a decrease in available memory and/or processing resources on the selected node. The controller may be comprised of a plurality of executable processing components, at least some of which are distributed across different memories of the second subset. The controller may be further capable of determining that the virtual machine has stopped running on the selected node, selecting another node of the second subset to run the virtual machine based on at least one of storage, memory and processing resources across the other nodes of the second subset, and restarting the virtual machine on the other node.

A computer-implemented method of managing a virtual machine configured in a computer cluster may include selecting a node from a second subset of the plurality of nodes to run the virtual machine in a second state of the plurality of states where the virtual machine is distributed between the second subset of the plurality of nodes, based on at least one of storage, memory and processing resources across the nodes of the second subset, providing access by the virtual machine to data stored in the storage devices of the second subset of the plurality of nodes, and running the virtual machine in the second state on the selected node. The computer cluster may be comprised of a plurality of nodes, each node of the computer cluster having a storage device, a memory, and at least one computer processor. The virtual machine may be comprised of a plurality of portions that are distributed between the plurality of nodes. The virtual machine may be configured into a first state of a plurality of states, such that, in the first state, the plurality of portions is distributed between a first subset of the plurality of nodes and each of the first subset of nodes stores a portion of the virtual machine in its corresponding storage device. Managing the virtual machine may further include making at least one change to the virtual machine as part of one or more test and development operations and storing new data resulting from the at least one change as a portion of the virtual machine in at least one of the plurality of nodes of the second subset. The virtual machine may be a clone of a backed-up virtual machine, such that any change made to the virtual machine as a result of one or more test and development operations is independent of the backed-up virtual machine. Managing the virtual machine may further include comparing the at least one of storage, memory and processing resources across nodes of the second subset to criteria of the same for the virtual machine. At least one of storage, memory and processing resources criteria of the virtual machine may be derived from a unified view of the machine generated by the controller. Managing the virtual machine may further include determining that at least one of the memory and processor of the selected node has met a related condition and selecting another node of the second subset to run the virtual machine as a result of said determination. The related condition may be a decrease in available memory and/or processing resources on the selected node. The controller may be comprised of a plurality of executable processing components, at least some of which are distributed across different memories of the second subset. Managing the virtual machine may further include determining that the virtual machine has stopped running on the selected node, selecting another node of the second subset to run the virtual machine based on at least one of storage, memory and processing resources across the other nodes of the second subset, and restarting the virtual machine on the other node.

A non-transitory computer readable medium may store instructions for implementing the computer-implemented method of managing a virtual machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining that a virtual machine is offline, wherein the offline virtual machine is associated with a first subset of a plurality of storage nodes of a storage system, and wherein the offline virtual machine is comprised of a plurality of portions that are distributed across the first subset of the plurality of storage nodes of the storage system;
   cloning a volume associated with the offline virtual machine;
   associating the cloned volume associated with the offline virtual machine with a second subset of the plurality of storage nodes of the storage system, wherein the cloned volume associated with the offline virtual machine is comprised of the plurality of portions that are distributed across the second subset of the plurality of storage nodes of the storage system, and wherein the second subset of the plurality of storage nodes of the storage system is different than, but overlaps with or has no overlap with, the first subset of the plurality of storage nodes of the storage system; and
   removing the volume associated with the offline virtual machine.

2. The method of claim 1, wherein the virtual machine is determined to be offline based on at least one of an out-of-memory condition, a heartbeat signal, a file operation failure, or a threshold number of file operation failures.

3. The method of claim 1, wherein cloning the volume associated with the offline virtual machine includes cloning a root node of a tree data structure corresponding to the offline virtual machine.

4. The method of claim 1, wherein the cloned volume associated with the offline virtual machine includes a data portion and an executable portion.

5. The method of claim 1, wherein an executable portion of the cloned volume associated with the offline virtual machine is run on a selected node of the second subset of the plurality of storage nodes of the storage system.

6. The method of claim 5, wherein the executable portion of the cloned volume associated with the offline virtual machine is moved from the first subset of the plurality of storage nodes of the storage system to the selected node of the second subset of the plurality of storage nodes of the storage system.

7. The method of claim 6, wherein the executable portion of the cloned volume associated with the offline virtual machine is loaded into a memory of the selected node of the second subset of the plurality of storage nodes of the storage system.

8. The method of claim 1, wherein removing the volume associated with the offline virtual machine includes removing a root node of a sub-tree data structure corresponding to the offline virtual machine.

9. A computer program product embodied in a non-transitory computer readable medium and comprising computer instructions to:
   determine that a virtual machine is offline, wherein the offline virtual machine is associated with a first subset of a plurality of storage nodes of a storage system, and wherein the offline virtual machine is comprised of a plurality of portions that are distributed across the first subset of the plurality of storage nodes of the storage system;
   clone a volume associated with the offline virtual machine;
   associate the cloned volume associated with the offline virtual machine with a second subset of the plurality of storage nodes of the storage system, wherein the cloned volume associated with the offline virtual machine is comprised of the plurality of portions that are distributed across the second subset of the plurality of storage nodes of the storage system, and wherein the second subset of the plurality of storage nodes of the storage system is different than, but overlaps with or has no overlap with, the first subset of the plurality of storage nodes of the storage system; and
   remove the volume associated with the offline virtual machine.

10. The computer program product of claim 9, wherein the virtual machine is determined to be offline based on at least one of an out-of-memory condition, a heartbeat signal, a file operation failure, or a threshold number of file operation failures.

11. The computer program product of claim 9, wherein cloning the volume associated with the offline virtual machine includes cloning a root node of a tree data structure corresponding to the offline virtual machine.

12. The computer program product of claim 9, wherein the cloned volume associated with the offline virtual machine includes a data portion and an executable portion.

13. The computer program product of claim 9, wherein an executable portion of the cloned volume associated with the offline virtual machine is run on a selected node of the second subset of the plurality of storage nodes of the storage system.

14. The computer program product of claim 13, wherein the executable portion of the cloned volume associated with the offline virtual machine is moved from the first subset of the plurality of storage nodes of the storage system to the selected node of the second subset of the plurality of storage nodes of the storage system.

15. The computer program product of claim 14, wherein the executable portion of the cloned volume associated with the offline virtual machine is loaded into a memory of the selected node of the second subset of the plurality of storage nodes of the storage system.

16. A system, comprising:
a processor configured to:
   determine that a virtual machine is offline, wherein the offline virtual machine is associated with a first subset of a plurality of storage nodes of a storage system, and wherein the offline virtual machine is comprised of a plurality of portions that are distributed across the first subset of the plurality of storage nodes of the storage system;
   clone a volume associated with the offline virtual machine;
   associate the cloned volume associated with the offline virtual machine with a second subset of the plurality of storage nodes of the storage system, wherein the cloned volume associated with the offline virtual machine is comprised of the plurality of portions that are distributed across the second subset of the plurality of storage nodes of the storage system, and wherein the second subset of the plurality of storage nodes of the storage system is different than, but overlaps with or has no overlap with, the first subset of the plurality of storage nodes of the storage system; and
   remove the volume associated with the offline virtual machine; and
a memory coupled to the processor and configured to provide the processor with instructions.

* * * * *